Oct. 31, 1967

D. A. VENIER ET AL 3,350,275

REACTOR FUEL ASSEMBLY DEVICE

Filed Aug. 26, 1965

INVENTORS
Dominic A. Venier
James L. Lass
BY
Charles L.B. Curry

Oct. 31, 1967

D. A. VENIER ET AL 3,350,275

REACTOR FUEL ASSEMBLY DEVICE

Filed Aug. 26, 1965

INVENTORS
Dominic A. Venier
James L. Lass
BY
Charles L. Curry

Oct. 31, 1967  D. A. VENIER ET AL  3,350,275

REACTOR FUEL ASSEMBLY DEVICE

Filed Aug. 26, 1965  5 Sheets-Sheet 5

INVENTORS
Dominic A. Venier
James L. Lass

BY Charles P. Curry

United States Patent Office 3,350,275
Patented Oct. 31, 1967

3,350,275
REACTOR FUEL ASSEMBLY DEVICE
Dominic A. Venier and James L. Lass, San Jose, Calif., assignors to General Electric Company, a corporation of New York
Filed Aug. 26, 1965, Ser. No. 482,792
8 Claims. (Cl. 176—78)

ABSTRACT OF THE DISCLOSURE

A nuclear reactor fuel element spacer device having fuel element support springs that support and minimize the area of contact with the fuel elements. The fuel element support springs are mounted on open lattice divider assemblies that have maximum support strength and minimum parasitic absorption of thermal neutrons. The periphery of the fuel element spacer device is shaped to provide ease of fuel element loading and minimum contact area with the fuel elements.

---

The present invention relates broadly to an improvement in nuclear fission reactors and more particularly to a device for spacing fuel elements within the fuel assemblies of such nuclear fission reactors.

The release of large amounts of energy through nuclear fission reactions is now quite well known. In general, a fissionable atom such as $U^{233}$, $U^{235}$, or $Pu^{239}$ absorbs a neutron in its nucleus and undergoes a nuclear disintegration. This produces on the average two fission products of lower atomic weight and great kinetic energy, and several fission neutrons also of high energy. For example, the fission of $U^{235}$ produces a light fission product and a heavy fission product with mass numbers ranging between 80 and 110 and between 125 and 155 respectively, and an average of 2.5 neutrons. The energy release approaches 200 mev. (million electron volts) per fission.

The kinetic energy of the fission products is quickly dissipated as heat in the nuclear fuel. If after this heat generation there is at least one net neutron remaining which induces a subsequent fission, the fission reaction becomes self-sustaining and the heat generation is continuous. The heat is removed by passing a coolant through heat exchange relationship with the fuel. The reaction may be continued as long as sufficient fissionable material exists in the fuel to override the effects of the fission products and other neutron absorbers which also may be present.

In order to maintain such fission reactions at a rate sufficient to generate useful quantities of thermal energy, nuclear reactors are presently being designed, constructed, and operated in which the fissionable material or nuclear fuel is contained in fuel elements which may have various shapes, such as plates, tubes or rods. These fuel elements are usually provided on their external surfaces with a corrosion-resistant non-reactive cladding which contains no fissionable or fertile material. The fuel elements are grouped together at fixed distances from each other in a coolant flow channel or region as a fuel assembly, and sufficient fuel assemblies are combined to form the nuclear reactor core capable of the self-sustained fission reaction referred to above. The core is usually enclosed within a reactor vessel.

One of the problems involved in the operation of nuclear reactors pertains to the structural failure or burnout of the fuel elements. This is often caused by fuel element spacer devices that impede the flow of coolant and therefore prevent adequate heat removal from certain external surfaces of the fuel element. The fuel element clad adjacent these surfaces will therefore reach excessively high temperatures which results in the decomposition or melting of the clad material. This may then lead to the formation of cracks or openings in the clad which directly exposes the fuel and fission product gases contained within the fuel element to the coolant of the reactor. When this occurs, not only must the fuel elements be replaced, requiring shutdown of the reactor, but the coolant will carry radioactive material and contaminate various parts of the reactor and coolant circuit.

Considerable difficulty has been encountered in developing a device for retaining the fuel elements of fuel assemblies in fixed space relation, as required by the physics of the system, and still provide for removal of heat at a sufficient rate to prevent structural failure or burnout of the fuel elements. Typical means for mechanically mounting fuel elements in spaced relation have included rigid fastening devices and mechanical connections having relatively large surface areas. However, devices of this type have frequently met with failure because they inhibit the removal of heat from the fuel elements.

While it is necessary to have a fuel element spacer device that overcomes the above-mentioned heat removal problem, it is also desirable that the device minimize "parasitic absorption" since this will increase the efficiency of the nuclear reactor. This becomes significant when several hundred of these devices are used in a single reactor core. Furthermore, it is desirable to provide a fuel element spacer device that permits ease of fuel element loading, has sufficient mechanical strength to withstand the reactor core environment during operation, does not vibrate against or cause excessive stress concentrations in the fuel elements, and permits longitudinal expansion and contraction of the fuel elements.

Briefly, the present invention provides a fuel element spacer device that utilizes a fuel element support spring that minimizes the area of contact with the fuel element and also provides sufficient bias to support adequately the fuel element during reactor operations. Furthermore, open lattice divider assemblies are provided for mounting the fuel element support springs that also provide maximum support strength and minimum parasitic absorption of thermal neutrons. In addition, the periphery of the fuel element spacer device is shaped to provide ease of fuel element loading and minimum contact area with the fuel element.

The subject matter which is regarded as the invention is particularly pointed out and distinctly claimed in the concluding portion of the specification. The invention, however, both as to its organization and operation, together with further objects and advantages thereof, may best be understood by reference to the following description taken in conjunction with the accompanying drawings in which:

Figure 1:
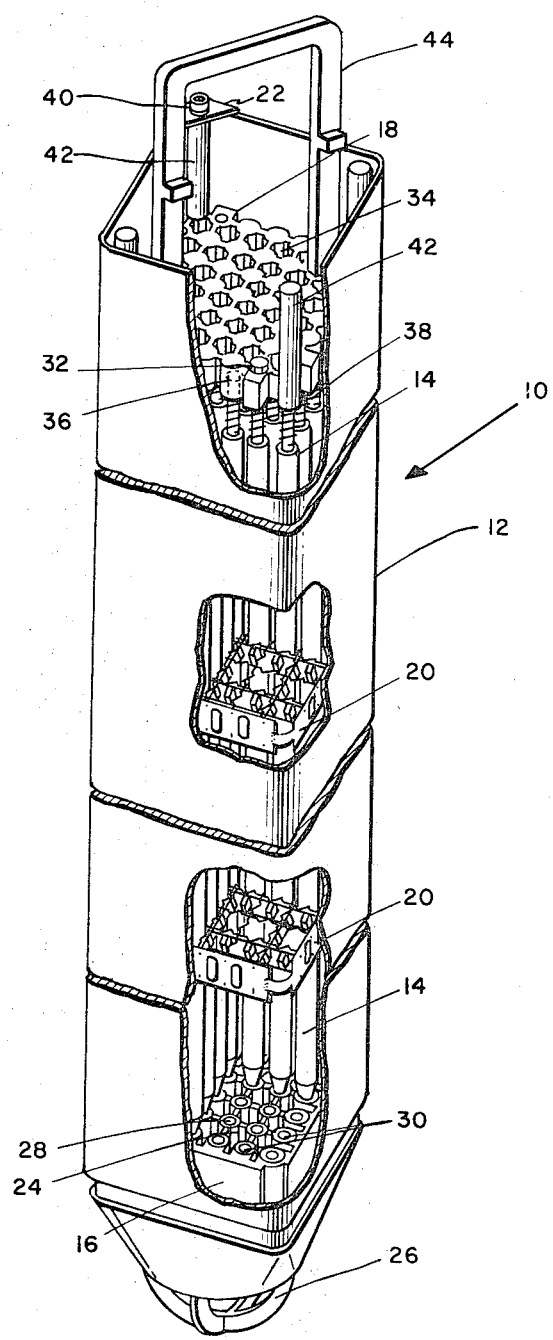
FIGURE 1 is an isometric view, partly in section, of a fuel assembly which incorporates the fuel element spacer device of the present invention.

In FIGURE 1 is illustrated a typical fuel assembly which incorporates the fuel element spacer device of the present invention. Fuel assembly 10 generally consists of open ended tubular channel 12, fuel elements 14, lower tie plate 16, upper tie plate 18, and fuel element spacer devices 20. Tubular channel 12 has a nearly square cross-section with the upper end having corner members 22 which support the channel after it has been inserted over the fuel elements. Fuel elements 14 are inserted into and are supported in spaced relation by a plurality of fuel element spacer devices 20 which rest against the interior surface of tubular channel 12. These fuel element spacer devices are separated from one another a predetermined distance along the bundle, for example, one and one-half feet, and are connected to one or more of the fuel elements to prevent longitudinal movement of the spacer devices.

This connection may be achieved by various means such as the attachment of locking devices to the fuel element at these same predetermined distances. Each such locking device may comprise a square collar welded to the outer surface of the fuel element. The square collar has a concentric opening with a diameter slightly larger than that of the fuel element so that it may be inserted thereover and welded in place. In addition, the outside dimensions of the square collars are slightly less than the dimensions of the hereinafter described cells of the spacer device. An annular groove extending around the periphery of the square collar is provided for receiving the retainer wires of the spacer device. After the fuel element has been inserted into the aligned cells of the spaced apart spacers and the grooves of the collars are aligned with the appropriate retainer wires, the fuel element is rotated about 45 degrees such that the grooves capture the retainer wires of the spacers. It is also important to note that the locking device should not create vapor pockets which may cause undesirable hot spots in the fuel element, and it should offer the least possible resistance to the flow of coolant in the channel. This locking device is not shown in the drawings since it does not form a part of the present invention.

Each fuel element 14 comprises an elongated tube containing a fissionable fuel material such as uranium. The fuel material is typically in the form of pellets placed end to end in the tube; however, it may be in the form of a powder or particles. Each end of the tube is sealed to prevent the coolant from contacting the fuel and to prevent fission product gas from escaping the fuel element.

The lower ends of the fuel elements are supported by lower tie plate 16 and register with support cavities 28 which are formed part way through the tie plate. Openings 24 are positioned adjacent cavities 28 and communicate directly with lower opening 26. The upper end of the tie plate has a square cross-section for receiving the lower end of tubular channel 12. The lower end of the tie plate is tapered and is supported by the internal structure of the reactor. When the fuel assembly is mounted in the reactor, lower opening 26 communicates with a supply plenum containing a source of coolant such as water. Several support cavities, such as the corner cavities denoted by reference numeral 30, are threaded and receive fuel elements having threaded ends.

Upper tie plate 18 is secured to these same threaded fuel elements by bolts, such as that denoted by reference numeral 32, registering with threaded upper extensions thereof. Openings 34 are provided in upper tie plate 18 to communicate the interior of the fuel assembly with the discharge plenum of the reactor. Fuel element support cavities 36 are formed part way through the upper tie plate and open at the inner surface thereof. These cavities receive the upper ends of the fuel elements and have sufficient depth to permit their longitudinal expansion. Compression springs 38 are provided to maintain a load, which is determined by the torque applied to nuts 32, between upper tie plate 18 and the upper shoulder of fuel elements 14. Tubular channel 12 is held in place by bolts 40, which are inserted through openings provided in corner members 22, which register with threaded extension 42 of upper tie plate 18. Upper tie plate 18 is also provided with a handle 44 which is used to raise and lower fuel assembly 10 in the reactor core.

While the above-described fuel assembly may be used in various types of nuclear reactors, it is particularly suited for use with boiling moderator-coolant type nuclear reactors. During operation of a typical boiling water reactor in which the fuel assembly may be employed, the coolant contained in the supply plenum of the reactor flows through lower opening 26, through openings 24 and upward within channel 12 where it surrounds and flows longitudinally along the exterior surface of fuel elements 14. As the coolant flows upwards it removes heat from the fuel elements and therefore increases in temperature and finally converts to wet steam, having a quality of 10%, for example. This wet steam then flows through openings 34 in upper tie plate 18 which discharge into a discharge plenum within the reactor. The discharge plenum receives the steam from a plurality of fuel assemblies which make up the reactor core. Wet steam from the discharge plenum is then dried and transmitted to a steam consuming device such as a turbine. The condensed steam from the steam consuming device may then be returned to the above-mentioned supply plenum.

Figure 2:
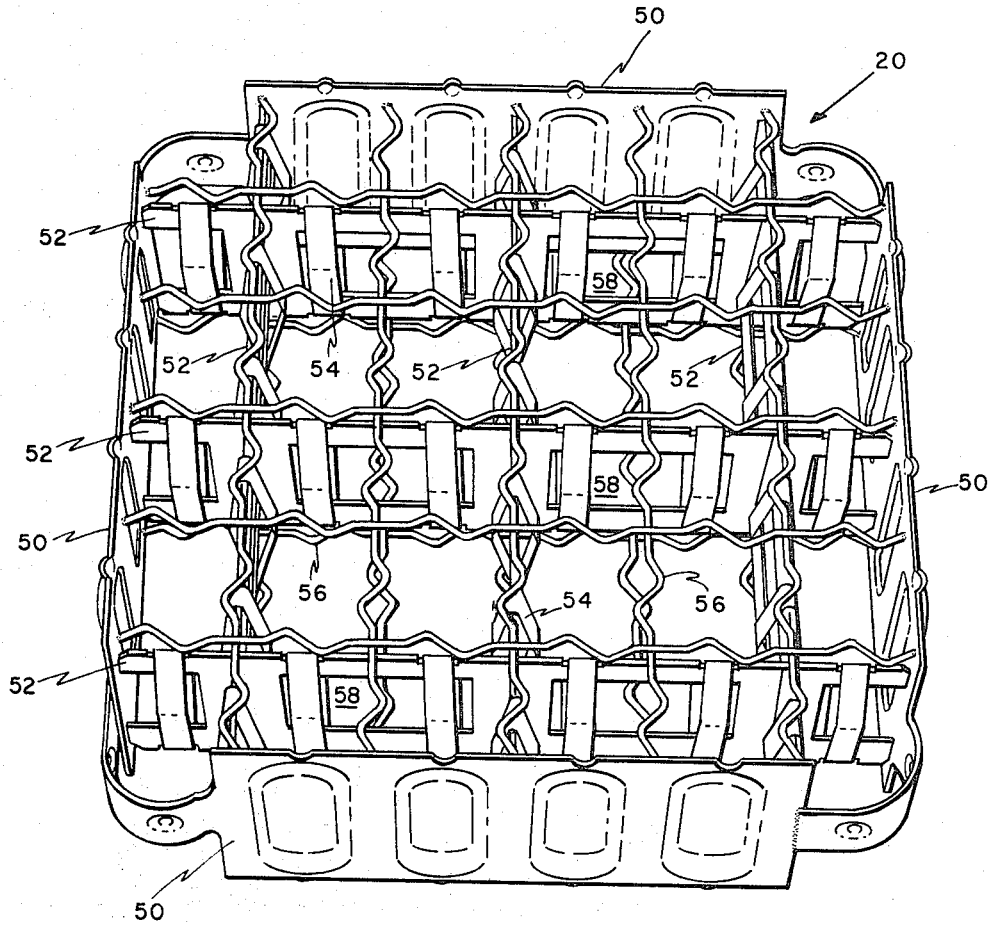
FIGURE 2 is an isometric view of a fuel element spacer device of the present invention.
Figures 3, 4:
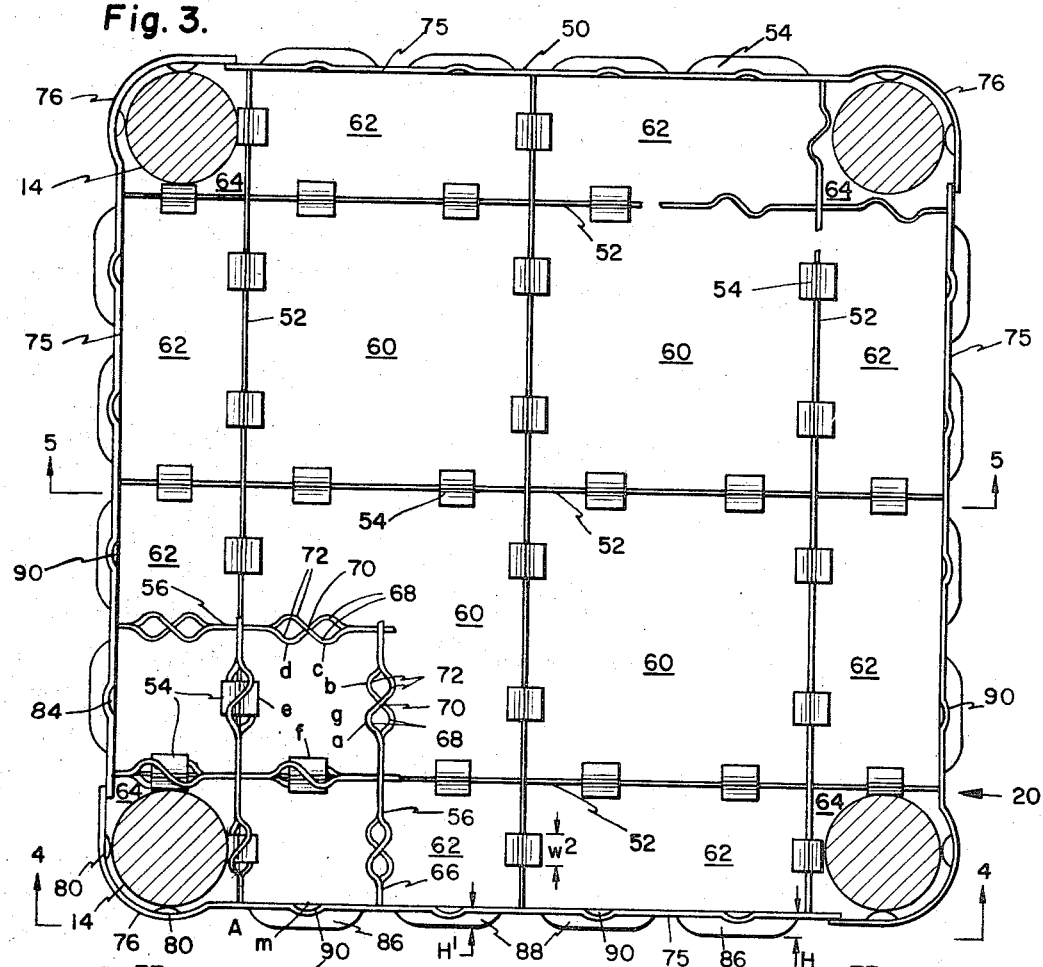
FIGURE 3 is a top elevation of the fuel element spacer device of the present invention.
FIGURE 4 is a side elevation, partly in section, taken at section 4—4 of FIGURE 3.

Referring now to FIGURES 2 and 3, the basic elements of fuel element spacer device 20 comprise peripheral support band 50, divider assemblies 52, fuel element support springs 54 (which shall be considered part of divider assemblies 52), and retainer wires 56. Peripheral support band 50 rigidly supports the ends of divider assemblies 52 and the ends of retainer wires 56.

Two sets of divider assemblies 52 are provided wherein each set consists of three equally spaced apart substantially parallel divider assemblies. The divider assemblies of these two sets are perpendicular to one another and interlock at their positions of intersection to form an "egg-crate" structure. Peripheral support band 50 and divider assemblies 52 together form four center cubicles 60, eight side cubicles 62 and four corner cubicles 64.

Four sets of retainer wires 56 are provided wherein each set consists of five equally spaced apart substantially parallel retainer wires. Two sets are positioned under the divider assemblies and the retainer wires of each set are perpendicular to one another. The other two sets are positioned above the divider assemblies and the retainer wires of each set are perpendicular to one another. Together, these retainer wires form four cells in each of the center cubicles 60, two cells in the side cubicles 62, and one cell in the corner cubicles 64. There are therefore a total of thirty-six cells wherein a single fuel element 14 occupies a single cell.

Each divider assembly 52 supports six fuel element support springs 54 that are spaced apart by predetermined distances such that each fuel element is supported by two support springs 54 within each cell. It should be particularly noted that each divider assembly has a structural configuration having low parasitic absorption characteristics which is made possible by providing an open lattice formed by a plurality of openings 58.

Retainer wires 56 function to firmly support each fuel element at positions opposite springs 54 except in the cells of the corner and side cubicles where peripheral support band 50 provides support in the hereinafter described manner. The retainer wires have straight end sections 66 that are welded to support band 50. To provide additional support, the retainer wires also may be welded at their points of intersection. Between the ends of each retainer wire are provided a plurality of outwardly curving sections 68, straight interconnecting sections 70, and inwardly curving sections 72, which are positioned opposite the support springs to support the fuel elements in the hereinafter described manner. The retainer wires that are longitudinally aligned with the divider assemblies are not in contact with the fuel elements and could therefore be straight wires, or possibly eliminated. However, they are made with the same configuration as the other retainer wires to provide support for the fuel elements in the event there is rapid lateral movement of the fuel elements, which may occur when there is a severe transient condition, or there is failure of one or more of support springs 54.

As best depicted in FIGURES 3 and 4, peripheral support band 50 comprises four identical sections 75 which are interconnected by curved bands 76 thereby forming a generally square configuration. The ends of five retainer wires are inserted into upper holes 77 in two opposite sections 75. The ends of the other five retaining wires are inserted into upper holes 77 of the remaining two opposite sections 75. These two sets of five substantially parallel retainer wires are disposed at right angles to one another and form a substantially common plane. The retainer wires inserted into lower holes 78 are positioned directly below the retainer wires inserted into the upper holes 77. They also form a substantially common plane but are rotated 180° with respect to the retainer wires inserted in holes 77. Therefore, fuel elements 14', positioned in the center cubicles 60, are supported at four points (a, b, c and d) by two outwardly curving sections 68 (points a and c) of the upper retainer wires and by the two inwardly curving sections 72 (points b and d) of the lower retaining wires. Fuel element 14' is also supported at points e and f by springs 54 which are located at 90° positions with respect to each other. The significance of these support positions and the type of springs employed will be later described in relation to FIGURES 8 through 10A.

The fuel elements located in corner cubicles 64 of fuel element spacer device 20 are each supported by two support springs and by two indentations 80 which are formed in curved bands 76 of peripheral support band 50. These indentations are positioned opposite the contact points of springs 54 and may have a spherically shaped surface such that there is only point contact with the exterior surface of the fuel elements. In this manner there is adequate flow of coolant adjacent these contact points which prevents the formation of hot spots in the fuel elements.

The fuel elements located in side cubicles 62 of the spacer device are each supported by two springs 54, a set of upper and lower retainer wires 56, and two contact regions 84 formed in peripheral support band 50. The set of upper and lower retainer wires 56 are positioned opposite one spring and function in the same manner as previously described with respect to the spring and associated set of retainer wires of the center cubicles. The two contact regions 84 are positioned opposite the other spring wherein the upper contact region is in about the same plane as formed by the upper retainer wires and the lower contact region is in about the same plane as formed by the lower retainer wires. The manner by which contact regions 84 are formed will be hereinafter described; however, it should be noted that these contact regions have only short contact lines with the fuel elements which prevent the formation of hot spots.

From FIGURES 3 and 4 it can be seen that each of the four sections 75 of peripheral support band 50 include two outer lobes 86 and two inner lobes 88. It should be particularly noted that each of outer lobes 86 have a height H which is greater than the heigh H' of inner lobes 88. Alternative arrangements are possible. For example, if all lobes were made having the same height, then all lobes would be in contact with the inner plane surface of channel 12 when fuel element spacer device 20 was inserted therein. To assure contact with all four lobes it would be necessary to employ very close tolerances for the heights of each lobe. Since this is difficult and expensive to achieve, the inner lobes are formed having lesser height than the outer lobes. Therefore, close tolerances are unnecessary and outer lobes 86 are the only lobes in contact with the inner surface of channel 12. It might therefore appear that inner lobes 88 need not be formed. This is not the case, however, since the flat from which they are formed would otherwise constitute a long contact region with the fuel element. This is undesirable since adequate coolant flow would be prevented from contacting the downstream part of this contact region with the resultant formation of undesirable hot spots. It also should be noted that, in place of forming lobes 88, the material from which these lobes are formed could be removed thereby leaving openings which would not constitute fuel contact regions. However, this arrangement has been found undesirable since vapor pockets form in the lower regions of these openings which prevent heat dissipation thereby resulting in burnout of the peripheral support band. The peripheral edges of lobes 86 and 88 are curved and sloped to prevent the formation of vapor pockets.

Along the upper edge of peripheral support band 50 and immediately above each of lobes 86 and 88 are formed indentations 90 as best illustrated in FIGURES 3 and 4. These indentations perform two basic functions. The first is to provide a smooth surface by which the fuel elements may be inserted into side cubicles 62 without scarring or scratching their external surfaces with the sharp upper edge of band 50. The second is to form the outer limits (point m) of contact regions 84. The inner limits (points n) of contact regions 84 are established by the outer edges of lobes 86 and 88.

Figures 5, 5A:
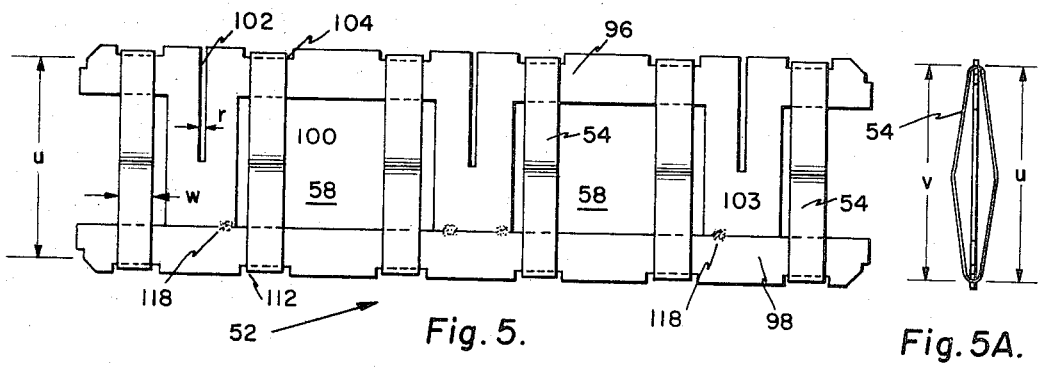
FIGURE 5 is a side elevation of a divider assembly of the fuel element spacer device taken at section 5—5 of FIGURE 3.
FIGURE 5A is an end view of the divider assembly of FIGURE 5.
Figure 6:
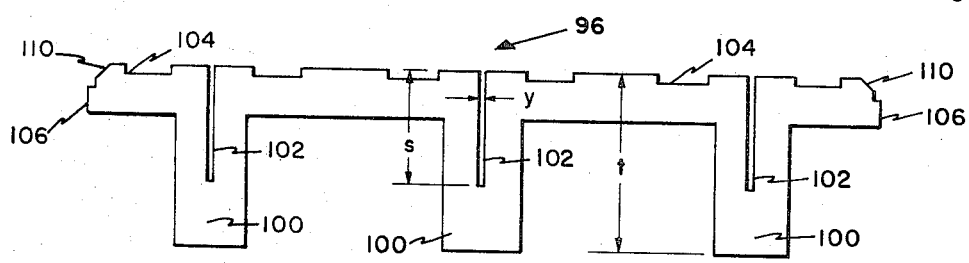
FIGURE 6 is a side elevation of the plate member of the divider assembly of FIGURE 5.
Figure 7:
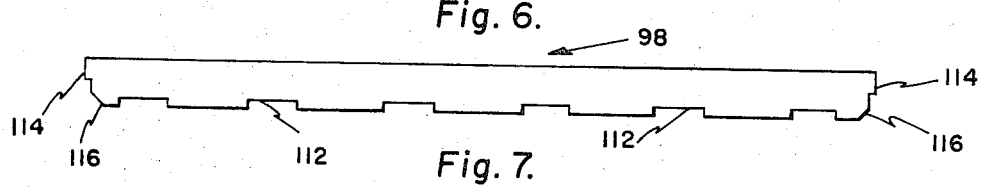
FIGURE 7 is a side elevation of the bar member of the divider assembly of FIGURE 5.
Figures 10, 10A:
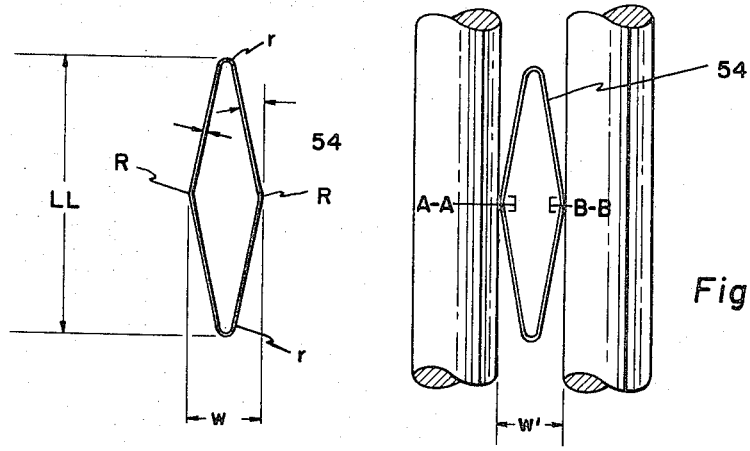
FIGURE 10 is an enlarged side elevation of a relaxed fuel element support spring of the present invention.
FIGURE 10A is an enlarged side elevation of a fuel element support spring of FIGURE 10 and illustrates the deflection characteristics of the spring when biasing the fuel elements.
Figure 8:
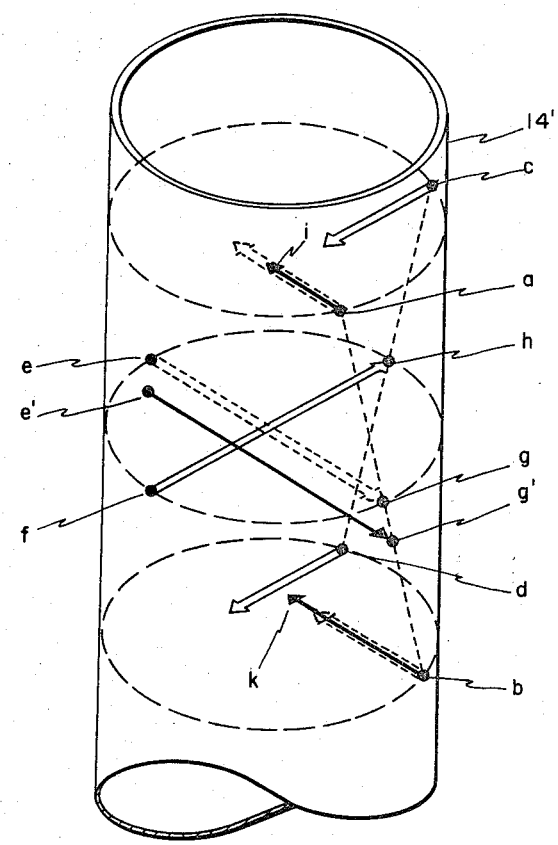
FIGURE 8 is a three-dimensional force diagram representing the forces acting on a fuel element and associated cell as illustrated in FIGURE 3.
Figures 9, 9A:
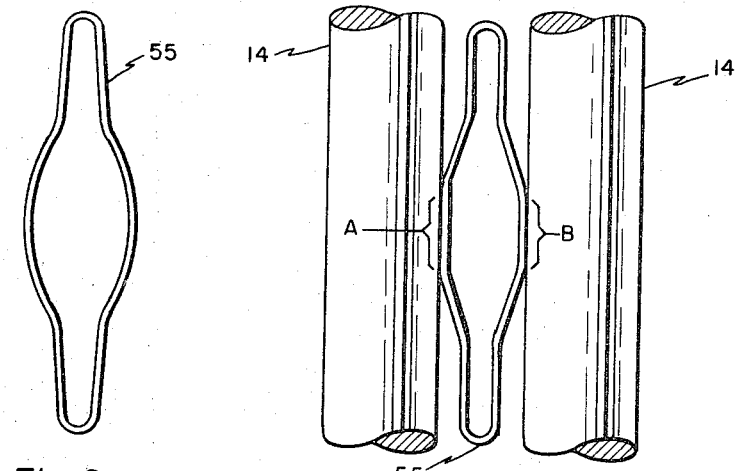
FIGURE 9 is an enlarged side elevation of a relaxed large curvature fuel element support spring.
FIGURE 9A is an enlarged side elevation of a large curvature fuel element support spring of FIGURE 9 and illustrates the deflection characteristics of the spring when biasing the fuel elements.

In FIGURES 5 and 5A is illustrated divider assembly 52 which generally consists of plate member 96, bar member 98 and fuel element support springs 54, the details of which are best illustrated in FIGURES 6, 7 and 10, respectively. The purposes of divider assemblies 52 are several and include the partitioning of support device 20 into various cubicles, providing structural rigidity to the support device, and supporting fuel element support springs 54 in their proper positions.

Referring to FIGURES 5 and 6 it can be seen that plate member 96 extends longitudinally, is integrally formed and includes three lateral extensions 100 haveing slots 102. Slots 102 have a width y which is slightly greater than the thickness of the material from which plate member 96 is made and a length s which is greater than half the width t of the plate member. The length s is made greater than half the width t by an amount sufficient to accommodate the accumulation of tolerances and provide ease of assembly.

Notches 104 are formed along the upper surface of plate member 96 and serve to receive springs 54 when assembled in the manner illustrated in FIGURE 5. Extensions 106 are formed at the outer ends of plate member 96 and are inserted into upper slots 108 of peripheral support band 50 as best depicted in FIGURE 4. The height of extensions 106 is selected to project slightly beyond the exterior surface of section 75 of band 50 to facilitate connection thereto by means of welding or the like. Chamfers 110 are provided to facilitate assembly and to eliminate sharp edges.

Referring now to FIGURES 5 and 7, bar member 98 is a longitudinally extending member having a plurality of notches 112 formed along the lower edge thereof and extensions 114 formed at each end thereof. Notches 112 are used to retain springs 54 and are spaced apart at intervals that correspond with notches 104 of plate member 96. Extensions 114 have a height greater than the thickness of sections 75 of band 50 and are inserted into lower slots 115 and welded in place. As in the case of plate member 96, chamfers 116 are formed to provide ease of assembly and to eliminate sharp edges.

Assembly of divider assembly 52 is achieved by first placing the springs in notches 104 of plate member 96 and then inserting bar member 98 through these springs and into the position illustrated in FIGURE 5. Plate member 96 and bar member 98 are then connected by spot welding, for example, at the positions indicated by reference numerals 118. The only function of the spot welds is to retain the various parts of divider assembly 52 in fixed relative positions while being subsequently handled during assembly of spacer device 20. Reliance upon the spot welds for structural rigidity is not necessary because the divider assemblies, when assembled in spacer device 20, are self-supporting as will hereinafter become apparent. From FIGURES 5 and 5A it can be seen that springs 54 are supported in notches 104 and 112 such that the distance $u$, which represents the distance between the inside surfaces of the notches, is less than the distance $v$, which represents the inside length of the springs when in a relaxed condition. This tolerance is provided to assure that the springs do not bind against the inside surfaces of the notches which may cause undesirable stress concentrations.

The devider assemblies 52 are self-supporting when assembled together in the fuel element spacer device as shown in FIGURES 2 and 3. The divider assemblies extending from left to right, as viewed in FIGURES 2 and 3, have their slots 102 extending upwards. Conversely, the divider assemblies extending from top to bottom have their slots extending downwards. Slots 102 are located at the cross-over positions and, therefore, when assembled, each slot receives the solid section of lateral extension 100 and the adjacent section of bar member 98. In this manner, self-supporting interconnections between the divider assemblies are achieved without relying upon welding or other connecting mechanisms for added strength.

It should be particularly noted that plate member 96 and bar member 98 together form a lattice structure that has a plurality of openings 58 formed between adjacent lateral extensions 100. As previously explained, these openings are quite important inasmuch as their provision reduces the parasitic absorption characteristics of fuel element spacer device 20 which improves the efficiency of the nuclear reactor in which they are used.

Another important feature of the present invention is the unique configuration of fuel element support springs 54. To better understand the significance of this feature reference is made to FIGURE 8 which is a three-dmensional representation illustrating the various forces and points of contact between fuel element 14' and upper retainer wires 56 (points $a$ and $c$), lower retainer wires 56 (points $b$ and $d$), and springs 54 (points $e$ and $f$), as illustrated in FIGURE 3.

At the outset it should be noted that point $e$ is opposite point $g$, the latter being a point positioned half the distance along the diagonal interconecting points $a$ and $b$. Therefore, the force which is exerted by spring 54 against point $e$ of fuel element 14' will be transmitted by the fuel element in a direction through point $g$ as indicated by the double dotted line force vector of FIGURE 8. The reactive forces exerted by retainer wires 56 at points $a$ and $b$ against fuel element 14' are illustrated by the double dotted line force vectors and are each opposite in direction and one-half the force exerted through point $e$. In like manner, point $f$ is opposite point $h$ which is a point positioned half the distance along the diagonal interconnecting points $c$ and $d$. Therefore, the reactive forces exerted by retainer wires 56 at points $c$ and $d$, as illustrated by the double solid line force vectors, are each opposite in direction and one-half the force exerted through point $f$ as represented by the double solid line force vector. It can therefore be seen that the design of each retainer wire may be identical since each wire is loaded by the same forces.

It is important to maintain this symmetrical force balance because unequal reactive forces at points $a$ and $b$, for example, may result in premature mechanical failure of the fuel elements. That is, with unsymmetrical loading, one of the retainer wire contact points will be loaded less which may permit the contact point of the retainer wire to vibrate and wear against the fuel element. The other contact point will be loaded more which may result in excessive stress concentration in the fuel element. This is important even though the magnitudes and differences of the unequal reactive forces are relatively small, especially since the retainer wires and fuel elements are subjected to many millions of vibrations during typical reactor operation.

An unsymmetrical condition will exist, for example, when the force exerted by spring 54 does not pass through point $e$ but instead passes through point $e'$. It has been found that the use of large curvature springs, such as that illustrated in FIGURE 9, result in considerable facial or line contact longitudinally along the surface of the fuel element as illustrated by bracketed portions A and B of FIGURE 9A. This frequently results in an unsymmetrical force distribution wherein the force exerted by the large curvature spring against the fuel element 14' passes through point $e'$ which is transmitted through point $g'$ as indicated by the single solid line force vector interconnecting these two points. This results in unequal reactive forces at points $a$ and $b$ as indicated by the single solid line force vectors $i$ and $k$. The displacement of point $e'$ and the difference between force vectors $i$ and $k$ are exaggerated for purpose of illustration.

Another difficulty encountered with a spring having a large curvature is that a contact line of substantial length between the fuel element and the spring restricts the flow of cooling fluid adjacent the downstream portion of the contact line. Since the heat generated by the fuel element will not be adequately dissipated in this region there will be the formation of an undesirable hot spot and corresponding failure of the fuel element cladding.

As best depicted in FIGURES 10 and 10A, fuel element support spring 54 of the present invention is made of flat or leaf spring material and has a very small radius of curvature R at the region of contact with the fuel element which substantially eliminates the above-mentioned problems encountered with large curvature springs. That is, when springs 54 bias against fuel elements 14 there are relatively short contact lines between the fuel elements and the springs as indicated by bracketed points A—A and B—B of FIGURE 10A. With these short cotact lines there are two basic improvements. First, the force distribution on the retainer wires is symmetrical since the force vectors pass through or very close to points $e$ and $f$ of FIGURES 3 and 8. Second, and perhaps most important, the short contact lengths between the fuel elements and springs permit adequate flow of cooling fluid adjacent these regions which results in the dissipation of heat and thereby prevents the formation of hot spots.

Another feature of fuel element support spring 54 is the provision of a very small radius of curvature R at the top and bottom of the spring. This small curvature maximizes the angle $\alpha$ and therefore minimizes the length of contact lines A—A and B—B when the spring is deflected by the fuel elements. That is, if the radius of curvature R were larger, then the angle $\alpha$ would decrease and the face of the spring adjacent the fuel element would become flatter. Therefore, the contact surface would increase when the spring is deflected by the fuel elements.

When spring 54 is deflected by the fuel elements it has a width $W^1$ (see FIGURE 10A) that must be greater than the width A (see FIGURE 3) of the retainer wires 56 by an amonut that prevents the fuel elements from being supported by the retainer wires during normal operation. In addition, the amounts of force and deflection $W-W^1$ of spring 54 when biasing the fuel elements are very carefully selected. As previously indicated, the force must be sufficient to prevent vibration of the retainer wire against the fuel element and yet not so great as to cause high local stresses in the fuel clad immediately beneath the retainer wire contact point. Furthermore, the spring deflection must be kept sufficiently small to maintain the contact length A—A and B—B less than a predetermined value in order to assure the proper flow of coolant in the contact regions and thereby prevent burnout of the fuel elements.

The following table sets forth the design characteristics of a typical spring which achieves these objectives:

| | |
|---|---|
| Length (LL) _____inch__ | 1.125 |
| Width (W) _____do____ | 0.240 |
| Radius (R) _____do____ | 0.031 |
| Radius (r) _____do____ | 0.015 |
| Thickness (t) _____do____ | 0.010 |
| Distance across spring leaf ($W^2$, FIG. 3) _____do____ | 0.188 |
| Force exerted by spring against fuel elements _____lbs__ | 3.6–5 |
| Deflection ($W-W^1$) _____inch__ | 0.060–0.120 |
| Material _____ | Inconel |

The material from which the structural elements of fuel element spacer device 20 are formed should be resistant to corrosion, have a low thermal neutron absorption cross-section and have suitable structural qualities. Zircaloy, an alloy of zerconium, has been found quite suitable for this purpose. However, because of zircaloy's relatively high cost, it may be necessary to substitute a material such as stanless steel. Therefore, in situations where cost is an important factor, the present invention has been found particularly advantageous since the open lattice framework of the divider assemblies makes it possible to use stanless steel and still realize a relatively low neutron absorption factor. Also, the unique structural arrangement of interconnecting the divider assemblies, mounting the springs and forming the openings make it possible to use the minimum quantity of stainless steel which also minimizes neutron absorption.

It will be appreciated by those skilled in the art that the spacer device of the present invention may be modified or changed to accommodate particular needs. For example, it may be desirable to provide a spacer device for supporting a greater or lesser number of fuel elements. To support additional fuel elements, for example, it would be necessary to provide additional springs and the like and modify the various structural elements in a manner which would accommodate these changes. Also, the shapes and dimension may be changed to accommodate particular needs.

It is to be understood that the specific dimension of the above-described support spring may be modified to the extent that it still performs its heretofore described founctions. For example, the above fuel element support spring characteristics were given for a spring that supported fuel elements at about one and one-half foot intervals wherein the diameter of the fuel element was about .56 inch and had a weight of about one pound per foot. Fuel elements which have different characteristics may require springs having different materials, lengths, widths and thicknesses.

A particular embodiment of this invention has been described and it should be understood that various other modifications and adaptations thereof may be made by those skilled in this particular art without departing from the spirit and scope of this invention as set forth in the following claims.

We claim:

1. A fuel assembly including at least one fuel element spacer device supporting a plurality of fuel elements in spaced relation, said fuel element spacer device comprising a peripheral support band, a plurality of spaced apart divider assemblies connected to said peripheral support band, each of said divider assemblies having at least one spring for supporting at least one fuel element, said spring having first and second about flat sections interconnected by a curved section having a small radius of curvature, said curved section of said spring being in contact with the exterior surface of a fuel element.

2. A fuel assembly including at least one fuel element spacer device supporting a plurality of fuel elements in spaced relation, said fuel element spacer device comprising a peripheral support band, a plurality of spaced apart divider assemblies connected to said peripheral support band, each of said divider assemblies having at least one spring for supporting at least one fuel element, said spring having an about parallelogram configuration wherein the sections forming the obtuse angle are interconnected by a curved section having a small radius of curvature and the sections forming the acute angle are interconnected by a curved section having a small radius of curvature, said first-mentioned curved section of said spring being in contact with the exterior surface of said fuel element.

3. A fuel assembly including at least one fuel element spacer device supporting a plurality of fuel elements in spaced relation, said fuel element spacer device comprising a peripheral support band, a plurality of spaced apart divider assemblies connected to said peripheral support band, each of said divider assemblies having at least one spring for supporting at least one fuel element, said spring having an about parallelogram configuration wherein the sections forming the obtuse angle are interconnected by a curved section having a radius of curvature of about .031 inch and the sections forming the acute angle are interconnected by a curved section having a radius of curvature of about .015 inch, said first-mentioned curved section of said spring being in contact with the exterior surface of said fuel element.

4. A fuel assembly including at least one fuel element spacer device supporting a plurality of fuel elements in spaced relation, said fuel element spacer device comprising a peripheral support band, means connected to said support band for supporting a plurality of springs, a plurality of retainer wires connected to said support band, some of said fuel elements being supported at first and second positions by retainer wires and at third and fourth positions by springs, said first and second positions being respectively about opposite said third positions and fourth positions, each of said springs having a curved section having a small radius of curvature, said curved section of said spring being in contact with the exterior surface of a fuel element.

5. A fuel assembly including at least one fuel element spacer device supporting a plurality of fuel elements in spaced relation, said fuel element spacer device comprising a peripheral support band, a plurality of spaced apart divider assemblies connected to said peripheral support band, each of said divider assemblies including a plate member having a plurality of extensions and a bar member, said bar member contacting the ends of said extensions and forming a plurality of openings between said extensions, a plurality of springs supported by said plate member and said bar member, said springs being in contact with the exterior surface of fuel elements.

6. A fuel assembly including at least one fuel element spacer device supporting a plurality of fuel elements in spaced relation, said fuel element spacer device comprising a peripheral support band, a first group of spaced apart about parallel longitudinally extending divider assemblies connected to said peripheral support band, a second group of spaced apart about parallel longitudinally extending divider assemblies connected to said peripheral support band, said first group of divider assemblies being about perpendicular to said second group of divider assemblies thereby forming a plurality of cubicles therebetween, first, second, third and fourth groups of longitudinally extending retainer wires connected to said peripheral support band, said first and second groups of retainer wires being respectively positioned above and below and about parallel to the first group of divider assemblies, said third and fourth groups of retainer wires being respectively positioned above and below and about parallel to the second group of divider assemblies, each of said divider assemblies, each of said divider assemblies having at least one spring for supporting at least one fuel element in said cubicles, each of the springs having first and second about flat sections interconnected by a curved section having a small radius of curvature, said curved section of each of said springs being in contact with the exterior surface of a fuel element.

7. A fuel assembly including at least one fuel element spacer device supporting a plurality of fuel elements in spaced relation, said fuel element spacer device comprising a peripheral support band, a first group of spaced apart about parallel longitudinally extending divider assemblies connected to said peripheral support band, a second group of spaced apart about parallel longitudinally extending divider assemblies connected to said peripheral support band, said first group of divider assemblies being about perpendicular to said second group of divider assemblies thereby forming a plurality of cubicles therebetween, first, second, third and fourth groups of longitudinally extending retainer wires connected to said peripheral support band, said first and second groups of retainer wires being respectively positioned above and below and about parallel to the first group of divider assemblies, said third and fourth groups of retainer wires being respectively positioned above and below and about parallel to the second group of divider assemblies, each of said divider assemblies having at least one spring for supporting at least one fuel element in said cubicles, each of said divider assemblies including at least one opening for transmitting neutrons when mounted in the core of a nuclear reactor.

8. A fuel assembly including at least one fuel element spacer device supporting a plurality of fuel elements in spaced relation, said fuel element spacer device comprising a peripheral support band, a first group of spaced apart about parallel longitudinally extending divider assemblies connected to said peripheral support band, a second groups of retainer wires being respectively posidinally extending divider assemblies connected to said peripheral support band, said first group of divider assemblies being about perpendicular to said second group of divider assemblies, first, second, third and fourth groups of longitudinally extending retainer wires connected to said peripheral support band, said first and second groups of retainer wires being respectively positioned above and below and about parallel to the first group of divider assemblies, said third and fourth groups of retainer wires being respectively positioned above and below and about parallel to the second group of divider assemblies, each of said divider assemblies including a pularity of notches for supporting a plurality of springs, each of said divider assemblies including a plurality of openings for transmitting neutrons when mounted in the core of a nuclear reactor.

References Cited
UNITED STATES PATENTS 3,158,549   11/1964   Fowler _____ 176—78
3,228,854   1/1966   Bekkering _____ 176—78

FOREIGN PATENTS 969,131   9/1964   Great Britain.

CARL D. QUARFORTH, *Primary Examiner.*

A. J. STEINER, *Assistant Examiner.*

UNITED STATES PATENT OFFICE
CERTIFICATE OF CORRECTION

Patent No. 3,350,275                        October 31, 1967

Dominic A. Venier et al.

It is hereby certified that error appears in the above numbered patent requiring correction and that the said Letters Patent should read as corrected below.

Column 2, line 69, strike out "of", first occurrence; column 6, line 57, for "haveing" read -- having --; column 7, line 33, for "devider" read -- divider --; line 44, for "are" read -- is --; lines 57 and 58, for "three-dmensional" read -- three-dimensional --; line 65, for "interconecting" read -- interconnecting --; column 8, line 57, for "cotact" read -- contact --; column 9, line 36, for "zerconium" read -- zirconium --; lines 39 and 43, for "stanless", each occurrence, read -- stainless --; same column 9, line 63, for "founctions" read -- functions --; column 11, lines 13 and 14, strike out "each of said divider assemblies,"; column 12, line 11 for "groups of retainer wires being respectively posi-" read -- group of spaced apart about parallel longitu- --; line 24, for "pularity" read -- plurality --.

Signed and sealed this 11th day of March 1969.

(SEAL)
Attest:

EDWARD M. FLETCHER, JR.                   EDWARD J. BRENNER
Attesting Officer                       Commissioner of Patents

Disclaimer 3,350,275.—*Dominic A. Venier* and *James L. Lass*, San Jose, Calif. REACTOR FUEL ASSEMBLY DEVICE. Patent dated Oct. 31, 1967. Disclaimer filed Oct. 4, 1974, by the assignee, *General Electric Company*.

Hereby enters this disclaimer to claims 1, 2, 3, 4, 5, 6, 7 and 8 of said patent.

[*Official Gazette November 26, 1974.*]